(12) United States Patent
Mauro et al.

(10) Patent No.: US 9,561,561 B2
(45) Date of Patent: Feb. 7, 2017

(54) PORTABLE BORING MACHINE

(71) Applicants:Raffaele Mauro, Amato (IT);
Francesco Costanzo, Marcellinara (IT)

(72) Inventors: Raffaele Mauro, Amato (IT);
Francesco Costanzo, Marcellinara (IT)

( * ) Notice: Subject to any disclaimer, the term of this patent is extended or adjusted under 35 U.S.C. 154(b) by 324 days.

(21) Appl. No.: 14/390,952

(22) PCT Filed: Apr. 9, 2013

(86) PCT No.: PCT/IB2013/000631
§ 371 (c)(1),
(2) Date: Oct. 6, 2014

(87) PCT Pub. No.: WO2013/153430
PCT Pub. Date: Oct. 17, 2013

(65) Prior Publication Data
US 2015/0052721 A1 Feb. 26, 2015

(30) Foreign Application Priority Data

Apr. 10, 2012 (IT) .............................. CZ2012A0006

(51) Int. Cl.
*B23K 28/02* (2014.01)
*B23B 45/00* (2006.01)
(Continued)

(52) U.S. Cl.
CPC ............. *B23K 28/02* (2013.01); *B23B 45/001* (2013.01); *B23B 45/008* (2013.01);
(Continued)

(58) Field of Classification Search
CPC ............ Y10T 29/5105; Y10T 29/5107; Y10T 29/5108; Y10T 29/5199; Y10T 29/5168; Y10T 29/5176; B23K 9/02; B23K 20/1285; B23K 26/0093; B23K 28/02; B23B 39/006; B23B 45/00; B23B 45/001; B23B 45/008; B23B 2260/096
(Continued)

(56) References Cited

U.S. PATENT DOCUMENTS 4,418,592 A 12/1983 Altman
5,350,259 A * 9/1994 Russo ..................... B23B 29/02
408/137

(Continued)

FOREIGN PATENT DOCUMENTS

| EP | 1 375 055 A1 | 1/2004 | |
| IT | EP0979702 A1 * | 2/2000 | ............. B23K 7/105 |
| WO | 03/053625 A1 | 7/2003 | |

*Primary Examiner* — Sunil K Singh
*Assistant Examiner* — Michael Vitale
(74) *Attorney, Agent, or Firm* — Seed IP Law Group LLP

(57) ABSTRACT

A portable boring machine includes: a transmission unit comprising a first electric motor having an axis of rotation (B) and a distribution block of the motion imparted by said electric motor to a tools shaft supporting means for boring and welding and having an axis of rotation (C); a centralized unit comprising a supporting shaft for advancement of said tools shaft formed by a hollow cylindrical tube internally comprising an externally threaded screw tube, and a second centralized electric motor adapted to manage said advancement; means for coupling and decoupling said transmission unit from said centralized unit. The portable boring machine further comprises an advancement system of said screw tube configured for converting the rotary motion imparted by said electric motor in straight linear motion of said screw tube along said axis (C).

5 Claims, 7 Drawing Sheets

(51) Int. Cl.
*B23K 26/00* (2014.01)
*B23K 31/02* (2006.01)

(52) U.S. Cl.
CPC .......... *B23K 26/0093* (2013.01); *B23K 31/02* (2013.01); *B23B 2260/096* (2013.01); *Y10T 29/5107* (2015.01); *Y10T 29/5108* (2015.01)

(58) Field of Classification Search
USPC ............. 29/26 A, 26 B, 26 R, 33 T, 50, 56.5
See application file for complete search history.

(56) References Cited

U.S. PATENT DOCUMENTS

| | | | | |
|---|---|---|---|---|
| 5,642,969 | A * | 7/1997 | Strait | B23B 29/02 408/124 |
| 6,073,322 | A * | 6/2000 | Russo | B23K 9/287 228/48 |
| 7,020,942 | B2 * | 4/2006 | Siracusa | B23K 9/048 219/76.1 |
| 2003/0126961 | A1 | 7/2003 | Russo | |

* cited by examiner

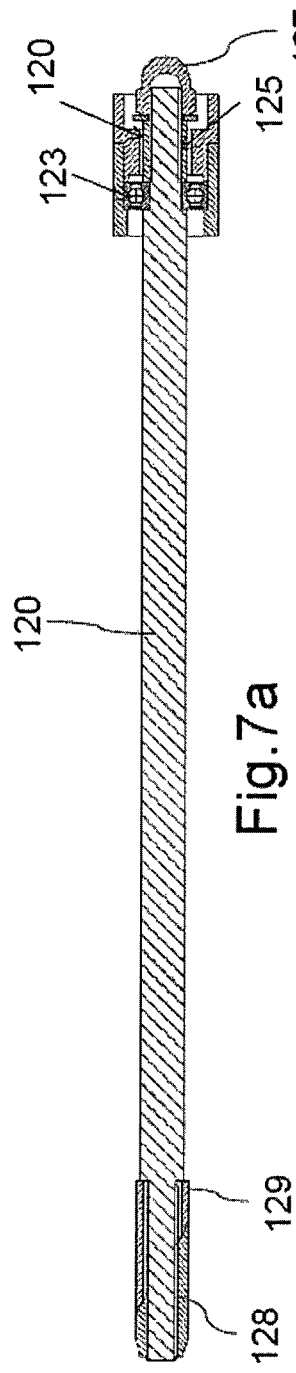
Fig.7a
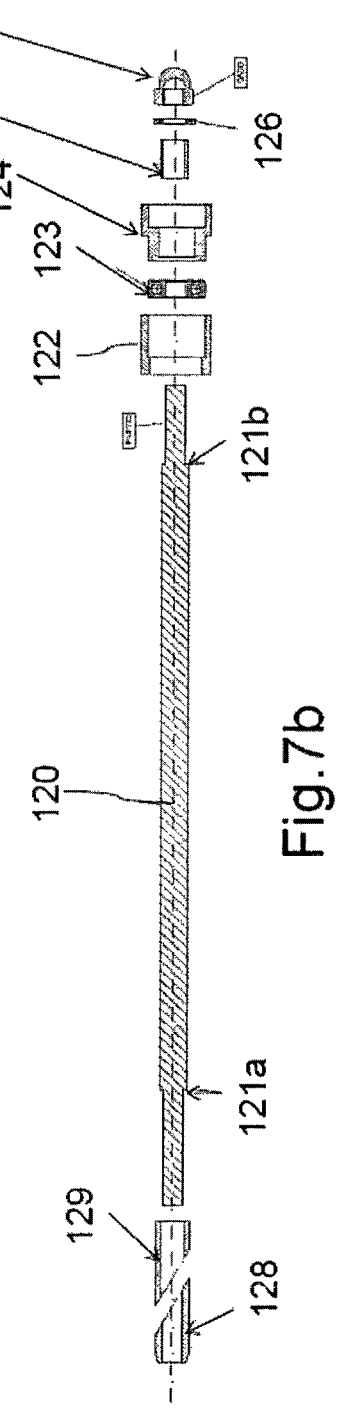
Fig.7b
Fig.7

PORTABLE BORING MACHINE

The present invention relates to a portable boring machine.

In particular, the present invention relates to a portable boring machine of the type of those that are normally used to carry out the boring and welding, namely the reconditioning of bores or seats for pivot pins, rotation bushings, on machines or their parts, without having to transport the piece to be restored in the workshop and without having to do the placement of the same piece on fixed tools machines.

As it is known, a portable boring machine is enabled to perform the operation of boring a seat to be reconditioned, the following operation of welding material by means of a welding operation and the recovery of the original dimensions and tolerances by means of an operation of finishing boring. A boring and welding machine can have three or two motors.

An example of a portable boring and welding machine having two motors is described in the Italian patent N. 0001336640 granted on Nov. 14, 2006 to SIR MECCANICA SPA. The patent describes a portable welding boring machine comprising a tubular supporting structure, a tool holder shaft, an advancement assembly of the tool holder shaft inserted within the tubular structure, and a group of rotation of the tool holder shaft. The tool holder shaft has a development axis and supports means for boring and means for welding parts to be machined. Moreover, the machine comprises a first electric motor for rotating the shaft holder shaft. The motor and the shaft are connected by rigid means of transmission, or by means of a couple formed by a helical gear and a worm screw. The helical gear is connectable to the tools holder shaft and the worm screw is connected to the driving shaft of the motor itself. The advancement assembly includes a second electric motor which, via a gear unit equipped, at the output, with a pinion, an elastic belt, a pulley and a bushing, transmits a forward motion to a threaded tubular member housed at least partially within the carrier structure.

Although effective under many respects, the above solution is affected by the problem that the use of rigid transmission means of the rotational motion from the motor to the tools holder shaft implies that the vibrations generated during the machine operations, propagating between the various parts of the machine, cannot be appropriately damped. In fact, even if it is necessary to have extremely rigid shafts for supporting without bending, the stress exerted on these shafts is very high, so if the rigidity of the shaft is not adequate, the effort which should be carried by the machine in the machining point influences negatively the precision of the machine. Therefore, the machine undergoes malfunctions, causing the risk of not guaranteeing a proper working tension and of reducing the quality of the machined surfaces.

One solution to this problem can be found in the international patent application WO 03053625 published on Jul. 3, 2003 to Russo Evangelista and that refers to a portable machine for welding and boring holes comprising two tubular elements and three gear motors. The first motor controls the rotation of the metal bar during the removal boring procedure, through a first gear wheel which drives a second toothed wheel which engages a third gear wheel connected to the motor hub through a key inserted into the groove of the boring bar. The second motor is provided with an elastic belt. On the axis of the third motor, which controls the rotation of the spindle during the hole welding procedure, the second toothed wheel 10 is mounted which engages with the third gear wheel, which is connected to the motor hub through a key inserted into the groove of the spindle. This pushes a tools holder shaft through a worm mechanism. The third motor, for the advancement of the spindle, actuates the tools holder shaft through a worm screw mechanism for locking the spindle on the second tubular element.

However, this solution uses three motors for powering, respectively, the rotation during the welding phase, the rotation during the boring step and the advancement and backward movement of the processing unit along the axis of the seat machining, resulting in a very complex, heavy and difficult to transport machine. Furthermore, the solutions described above do not allow the operator to avoid dismantling the machine to transfer it in different places in which to carry, for example, the only welding operation. Therefore, the transport of such machines requires a very difficult transportation.

A solution of decomposable and, therefore, transportable machine is described in the patent application US 2003126961 published on Jul. 10, 2003 to Russo Evangelista. This patent application describes a modular tool machine for chip removal, on holes of large diameter and great length, consisting of a shaft on which is located a machine base, controlled by a first motor for the rotation and by a second motor for the translation, on which the tools elements are mounted. Two support bearings are mounted on both sides of the tools shaft, all having rays with radial grooves in which groups for adjusting and locking the tools shaft are inserted. A hydraulic clamp is mounted at least on one side, at the two ends of the shaft and two grooved shoulder elements are mounted to allow that the hydraulic clamp exerts the required pressures for locking the tool shaft.

However this solution is specifically designed to perform machining operations under water and, consequently, uses elements that must have the characteristic of being able to be used under water without rumbling. So, it might be very expensive.

The purpose of the present invention is to provide a portable boring machine able to perform the boring and the welding operations and comprising a transmission unit and a centralized unit which can be coupled or uncoupled depending on the request machining operation or depending on the place where the machining is required.

According to the present invention a portable boring machine is provided, as defined in claim 1.

For a better understanding of the present invention a preferred embodiment is now described, as a non-limiting example, with reference to the accompanying drawings, in which.

Figure 6:
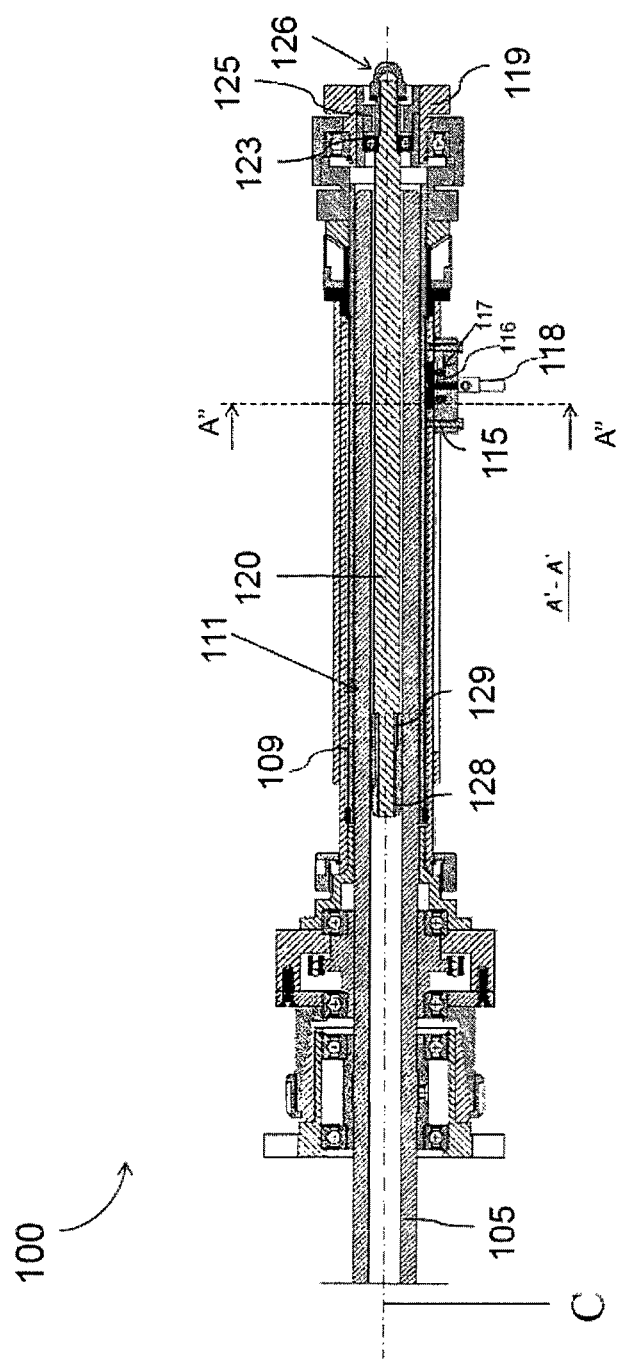

FIGS. 5*a*-5*b* show a schematic view respectively along a section A'-A' and along a section A"-A" of a portion of a portable boring machine comprising a blocking system, according to the invention;

FIG. 6 shows a schematic view along a section A'-A' of a second portion of a portable boring machine comprising a blocking system, according to the invention;

FIGS. 7a-7b show a schematic view of the blocking system, respectively assembled and not assembled, of a portable boring machine, according to the invention.

Figure 1:
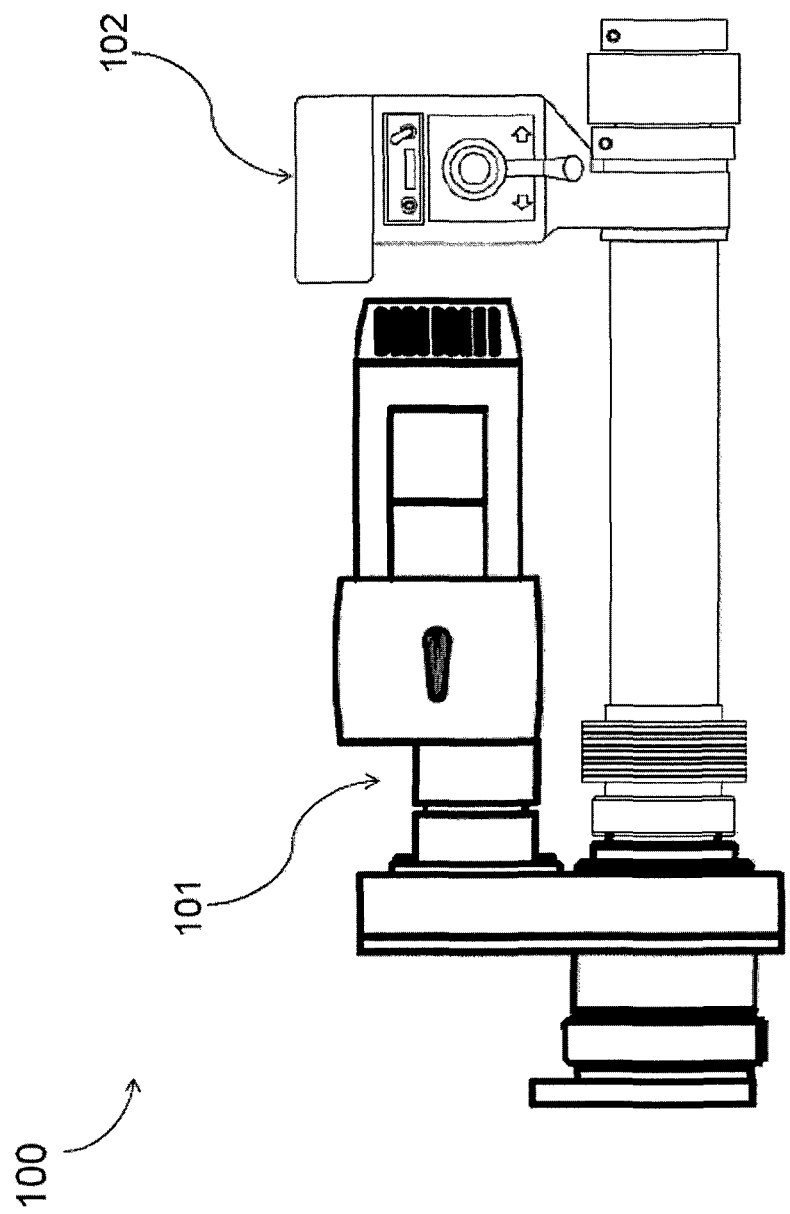
FIG. 1 shows a schematic side view of a portable boring machine, according to the invention.
Figure 2:
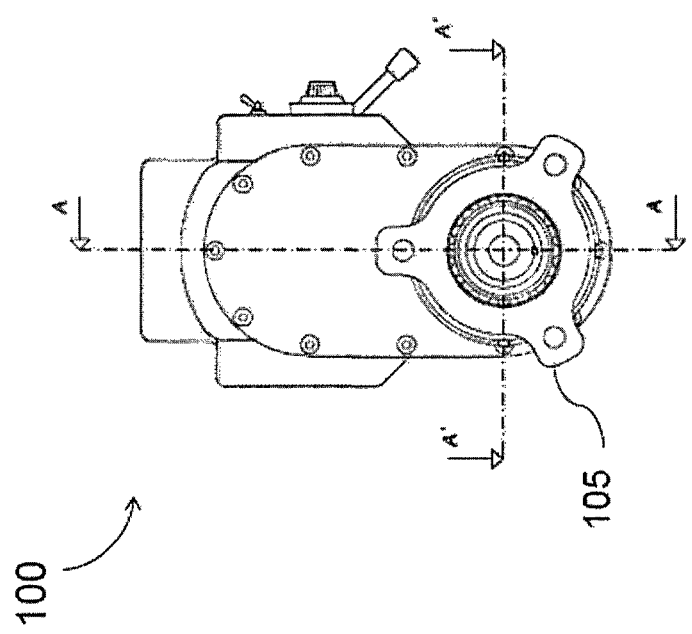
FIG. 2 shows a schematic front view of a portable boring machine, according to the invention.
Figure 3:
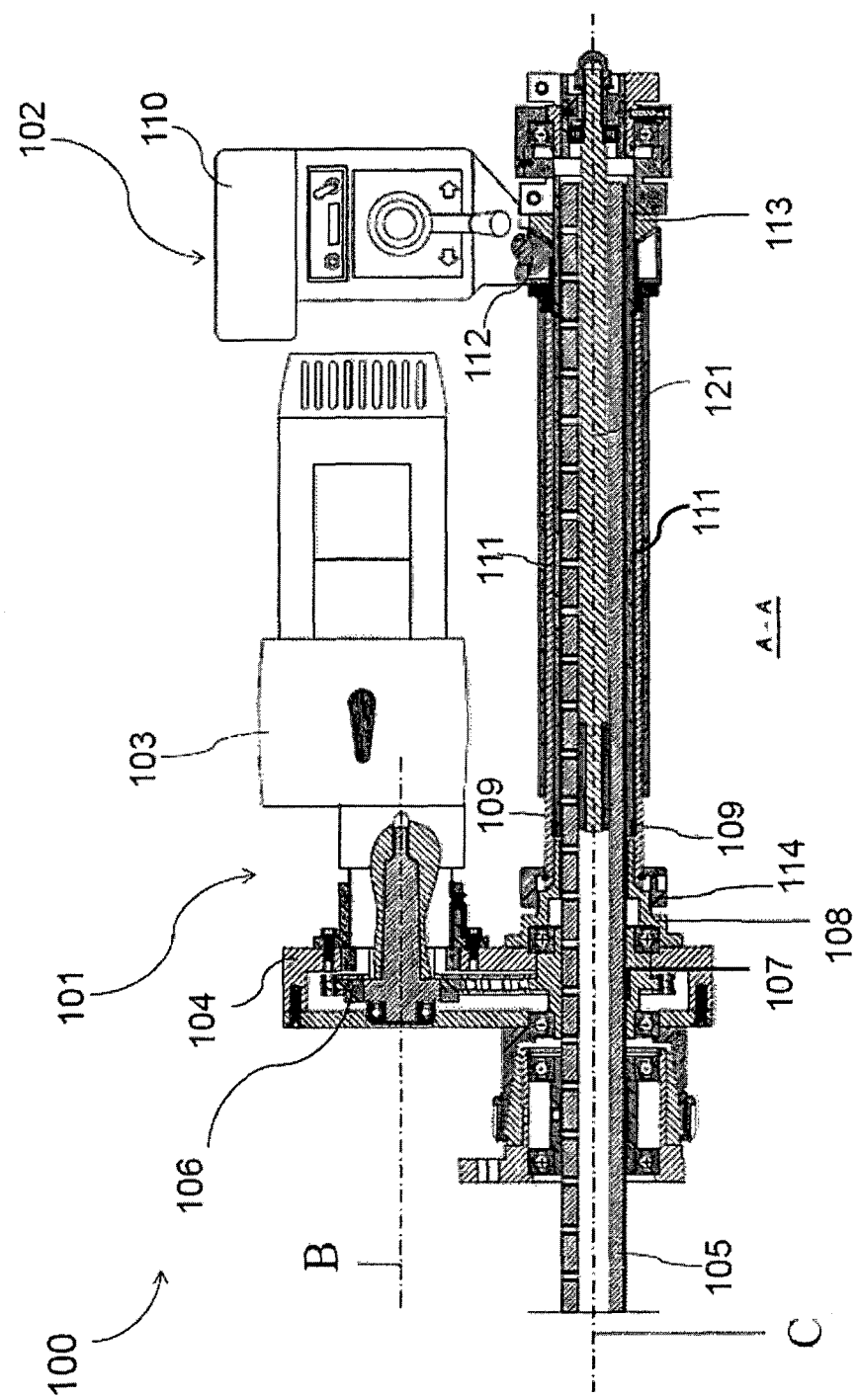
FIG. 3 shows a schematic side view, along a section A-A, of a portable boring machine, according to the invention.

With reference to these figures, and, in particular, to FIG. 1, a portable boring machine 100 is shown, according to the invention. The portable boring machine comprises a transmission unit 101 and a centralized unit 102. A front view of the machine 100 is shown in FIG. 2, in which its cross section A-A and its longitudinal section A'-A' are shown. More in details, the cross section A-A of the machine 100 is shown in FIG. 3. The transmission unit 101 comprises an electric motor 103 having a rotation axis B and a distribution block 104 to support it and to transmit the rotation impressed by the motor 103 to a tools holder shaft 105 having an rotation axis C. The flexible mechanical transmission of the motion generated by the electric motor 103 is performed inside the distribution block 104 which comprises a first drive ring gear 106, whose rotation axis coincides with the rotation axis B of the electric motor, and a second conduct ring gear 107, whose axis of rotation coincides with the rotation axis C of the tools holder shaft 105. In particular, the motion is transmitted from the drive ring gear 106 to the conduct ring gear 107 via a suitable transmission chain. Furthermore, the transmission unit 101 present, at the output, a bushing 108 having a conical seat. The centralized unit 102 is configured for allowing the advancement and the advancement speed change of the tools holder shaft 105 for the boring machining and of the torch holder bar for welding machining.

The centralized unit 102 includes a supporting shaft 109 for advancement of the tools holder shaft 105 and of the torch and a centralized electric motor 110 that allows the operator to maneuver the machine in a more smooth and controlled way and to vary the advancement speed of the centralized unit 102, of the tools holder shaft 105 and of the torch.

Figure 4:
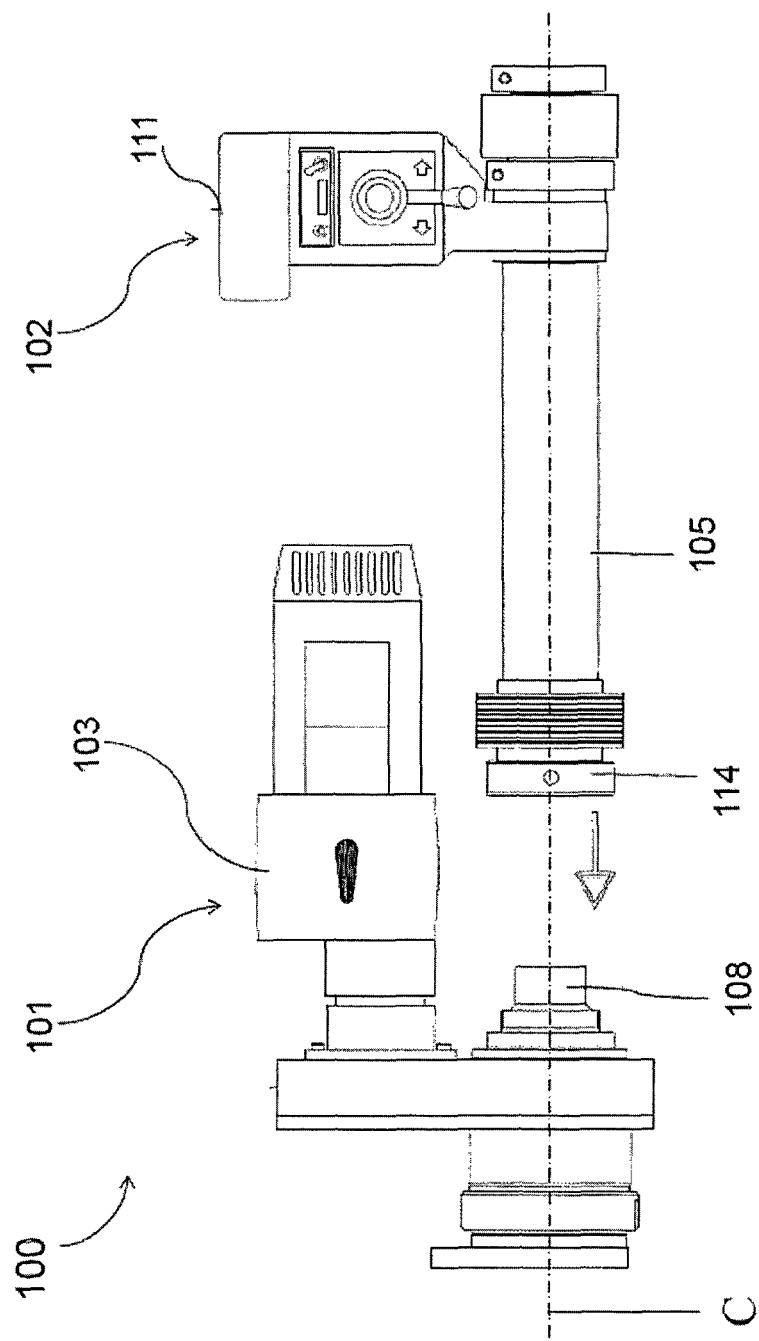
FIG. 4 shows a schematic view of means for coupling a transmission unit and a centralized unit of a portable boring machine, according to the invention.

The supporting shaft 109 is substantially formed by a hollow cylindrical tube internally comprising an externally threaded screw tube 111 and it functions as an advancement member. The rigid mechanical transmission of the motion generated by the electric motor 110 to the screw tube 111 is performed via a conical toothing pinion gear 112 positioned at the exit of the centralized electric motor 110. The conical toothing pinion gear 112 meshes with a conical ring gear 113 locked to the screw tube 111 so as to cause its rotation with respect to the axis C. The centralized unit 102 also includes a ring nut 114, positioned at one end of the supporting advancement shaft 109 opposite to the output end of the tools holder shaft 105, and configured to be coupled with the bushing 108 having a conical seat located at the output of the transmission unit 101. In FIG. 4, the transmission unit 101 and the centralized unit 102 are shown in a decoupled configuration. They are configured to be coupled by means of the engagement of the ring nut 114 with the bushing 108.

Moreover, the machine 100 comprises an advancement system that allows to transform the rotary motion impressed by the electric motor 103 in translational motion of the screw tube 111 along the axis C. FIGS. 5a and 5b show schematic views of a first portion of the advancement system respectively along the section A'-A' and along the section A"-A". In particular, the advancement system comprises an element 115 integral with the shaft 109 and fixed to this by means of screws; a movable threaded dowel 116 acting as anchor nut placed inside of the supporting shaft 109; at least one spring 117, and preferably two springs, included in the element 115 and that exerts pressure on the threaded dowel 116; and a lever element 118 hinged to a pin passing through the threaded dowel 116 and movable from a central position P to a right angular position D and from the central position P to a left angular position S.

In use, when the lever element 118 is put in the central position P, the threaded dowel 116 is pushed radially to the screw tube 111 allowing the coupling between the transmission unit 101 and the centralized unit 102. In this configuration, the rotary motion of the screw tube 111 generated by the centralized electric motor 110 is transformed into a rectilinear motion of the screw tube 111 along the axis C of the tools holder shaft 105, allowing its advancement. Instead, when the lever element 118 is in the position D or S, the threaded dowel 116 is pushed back from the screw tube 111 so decoupling the transmission unit 101 from the centralized unit 102.

According to one aspect of the invention, the lever element 118 allows to manually position the centralized unit 102 in the working position to perform the welding operations of boring and welding.

Advantageously, the advancement system allows the operator to position the centralized unit 102 more quickly in the state of machining start or resumption after performing the full advancement of the unit 102.

According to an aspect of the invention, the transmission unit 101 is, in a first step, axis centered by means of suitable fixing instruments and, in a second step, coupled to the centralized unit 102.

According to a further aspect of the invention, the central unit 102 serves as a machine for automatic advancement of the welding torch. Therefore, if the requested machining is the only welding, the centralized unit 102 only is centered on the part to be machined.

Figure 5:
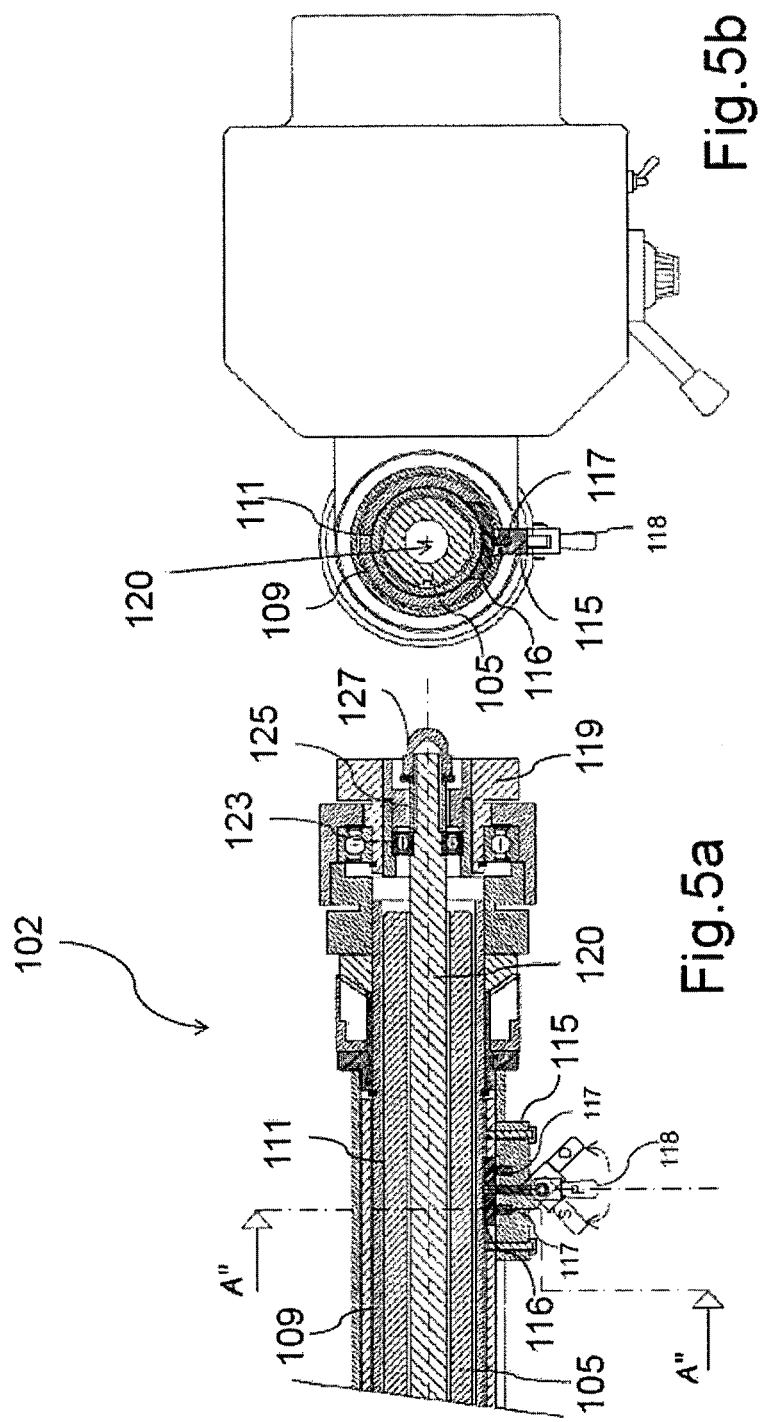

The machine 100 also includes a blocking system that prevents the displacements along the axis C of the tool holder shaft 105 during processing. In particular, as shown in FIGS. 5 and 6, and, for a better understanding, in FIG. 7, the machine 100 comprises:— a locking member 119, positioned at the rear end of the central unit 102;—a locking shaft 120 for blocking the tools holder shaft 105 having a first abutment tooth 121a and a second abutment tooth 121b; a first support 122 in which is inserted the locking shaft 120, an involute bearing 123 configured to ensure the possibility of rotation of the tool holder shaft 105 and to secure it axially; a second support 124 in which is inserted a bushing 125 integral with the locking member 119 and the locking shaft 120. Also the bearing 123 is integral with the blocking shaft 120, which is inserted inside the support 122, the bearing 123, the support 124 and the bushing 125 until the second abutment tooth 121b engages the bearing 123. A washer 126 is inserted around the bushing 125 and a nut 127 locks the translational movement of the locking shaft 120 and consequently of the central unit 102, so that the whole machine 100 is centered and locked to be ready for the machining operations.

The blocking system also includes a first threaded bushing 128, integral with the locking shaft 120, and a second free bushing 129. The first bushing 128 has an inclined surface facing the inclined surface of the second bushing 129. The rotation of the locking shaft 120 determines the axial displacement of the bushing 128. Consequently, the contact of the two inclined surfaces of the bushings 128 and 129 determines their radial displacement in opposite directions and their thrust towards the inner walls of the tools holder shaft 105.

Therefore, the portable boring machine according to the invention, being decomposable into two parts, allows the separate transportation of the transmission unit 101 and the centralized unit 102 depending on which of them is required for the machining operation.

Another advantage consists in the fact that the portable boring machine according to the invention allows to make the work of the operator less tiring, being remarkably handy.

Additionally, the portable boring machine according to the invention allows to center only the centralized unit on the part to be machined, if the requested machining operation processing is only the welding.

Finally it is clear that the portable boring machine described and illustrated here may be subject to modifications and variations without thereby departing from the protective scope of the present invention, as defined in the appended claims.

The invention claimed is:

1. A portable boring machine comprising:
 a transmission unit comprising a first electric motor imparting rotation about a first axis of rotation (B) and a distribution block configured to distribute said rotation imparted by said first electric motor to a tools shaft, wherein said tools shaft supports means for boring and welding and has a second axis of rotation (C) extending there through;
 a centralized unit which includes,
  a supporting shaft for advancement of said tools shaft, the supporting shaft being formed by a hollow cylindrical tube having an externally threaded screw tube contained therein, and
  a centralized second electric motor adapted to manage said advancement;
 means for coupling and decoupling said transmission unit from said centralized unit; and
 an advancement system configured to advance said screw tube and convert rotary motion imparted by said second electric motor into straight linear motion of said screw tube along said second axis of rotation (C), wherein said advancement system includes,
  at least one element fixed to said supporting shaft;
  at least one threaded dowel movable inside said supporting shaft;
  at least one spring positioned in said at least one element and acting on said at least one threaded dowel; and
  at least one lever element hinged to a pin passing through said at least one threaded dowel, the at least one lever element being movable from a central position P to a right angular position D and to a left angular position S.

2. The portable boring machine according to claim 1, wherein said at least one threaded dowel is radially pushed inward towards said screw tube in the configuration in which said at least one lever element is put in the center position P, and said transmission unit is coupled with said centralized unit.

3. The portable boring machine according to claim 1, wherein said at least one threaded dowel is radially withdrawn from said screw tube in the configuration in which said at least one lever element is in the right angular position D or the left angular position S, and said transmission unit is decoupled from said centralized unit.

4. The portable boring machine according to claim 1, wherein said at least one lever element is configured for positioning said centralized unit of said portable boring machine in a working position to perform only a welding operation.

5. The portable boring machine according to claim 1, further comprising a blocking system that prevents displacement of the tools shaft along said second axis of rotation (C) during working operations, wherein said blocking system includes,
 a locking member positioned at a first end portion of said centralized unit;
 at least one first bushing integral with said locking member;
 a locking shaft for blocking said tools shaft;
 at least one involute bearing integral with said at least one first bushing and with said locking shaft, the at least one involute bearing being configured to make possible the rotation of the tools shaft and to secure the tools shaft axially;
 a threaded second bushing integral with said locking shaft and positioned on an opposite end of said locking shaft than said at least one first bushing; and
 a free third bushing, the threaded second bushing and the free third bushing having respective inclined surfaces, said inclined surfaces being in contact with each other in a configuration in which said threaded second bushing moves axially as a result of locking shaft screwing, said contact between said inclined surfaces causing radial displacements in opposite directions of said second and third bushings and a thrust of said second and third bushings toward inner walls of said tools shaft, causing a blocking of the tools shaft.

* * * * *